(12) United States Patent
Hirabayashi et al.

(10) Patent No.: US 7,810,226 B2
(45) Date of Patent: Oct. 12, 2010

(54) METHOD OF MANUFACTURING A THIN-FILM MAGNETIC HEAD HAVING AN ELEMENT HAVING A LOWER LAYER WITH A NARROWER WIDTH

(75) Inventors: Hiraku Hirabayashi, Chuo-ku (JP); Yohei Koyanagi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 749 days.

(21) Appl. No.: 11/723,349

(22) Filed: Mar. 19, 2007

(65) Prior Publication Data

US 2007/0223140 A1    Sep. 27, 2007

(30) Foreign Application Priority Data

Mar. 24, 2006    (JP) .............................. 2006-082665

(51) Int. Cl.
*G11B 5/187* (2006.01)
*B44C 1/22* (2006.01)

(52) U.S. Cl. .............. 29/603.12; 29/603.15; 29/603.16; 29/603.18; 216/22; 216/44; 360/125.1; 360/125.47; 360/125.52; 360/125.65

(58) Field of Classification Search .............. 29/603.07, 29/603.12, 603.15, 603.16, 603.18; 216/22, 216/41, 44; 360/125.1, 125.12, 125.47, 125.52, 360/125.65
See application file for complete search history.

(56) References Cited

U.S. PATENT DOCUMENTS 5,867,890 A    2/1999    Hsiao et al.

2006/0044681 A1 *  3/2006  Le et al. ............. 360/125.12 X

FOREIGN PATENT DOCUMENTS

| JP | 04-006603 | 1/1992 |
|----|-----------|--------|
| JP | 07-093711 | 4/1995 |
| JP | 09-063017 | 3/1997 |
| JP | 10-105919 | 4/1998 |
| JP | 2003-242608 | 8/2003 |
| JP | 2005-063562 | 3/2005 |
| JP | 2005158192 A * | 6/2005 |
| JP | 2005-332484 | 12/2005 |
| JP | 2005-346786 | 12/2005 |

OTHER PUBLICATIONS

Japanese Office Action dated Oct. 14, 2008.

* cited by examiner

*Primary Examiner*—A. Dexter Tugbang
(74) *Attorney, Agent, or Firm*—Frommer Lawrence & Haug LLP

(57) ABSTRACT

A manufacturing method of a thin-film element having a lower layer with a narrower width is provided, which comprises steps of: forming a first film and a second film on the first film; forming a second layer having a width $W_{UP}$ obtained by trimming the second film; forming a mask film having a smaller etching rate than the first film so as to cover the second layer; forming a pattern having a width $W_{TR}$ larger than the width $W_{UP}$, obtained by collectively trimming the mask film covering the second layer and at least an upper portion of the first film; and forming a first layer having a width $W_{LO}$ smaller than the width $W_{UP}$ or having a portion with a width $W_{LO}$ smaller than the width $W_{UP}$, obtained by trimming the first film without changing the width $W_{UP}$ of the second layer.

2 Claims, 12 Drawing Sheets

METHOD OF MANUFACTURING A THIN-FILM MAGNETIC HEAD HAVING AN ELEMENT HAVING A LOWER LAYER WITH A NARROWER WIDTH

PRIORITY CLAIM

This application claims priority from Japanese patent application No. 2006-082665, filed on Mar. 24, 2006, which is incorporated herein by reference.

BACKGROUND OF THE INVENTION

1. Field of the Invention

The present invention relates to a manufacturing method of a thin-film element having a stacked structure of thin films. In particular, the present invention relates to a manufacturing method of a thin-film magnetic head used for magnetic recording. Further, the present invention relates to a thin-film magnetic head used for magnetic recording, a head gimbal assembly (HGA) provided with the thin-film magnetic head, and a magnetic disk drive apparatus provided with the HGA.

2. Description of the Related Art

Recently, due to demands for large-capacity and downsizing of magnetic disk drive apparatuses, further improvement on recording density has become necessary. Important points in higher recording density include improvement on the intensity of write fields generated from a thin-film magnetic head. As a structure intended to improve the intensity of write fields, there has been disclosed in Japanese Patent Publication No. 04-006603A, a metal-in-gap head, which is a bulk head, including a metallic layer having a plurality of thin-films, for example. Further, in Japanese Patent Publication No. 10-105919A, there has been disclosed a thin-film magnetic head in which an upper distal magnetic pole is formed of a material having a high saturation magnetic flux density.

Recently, in order to respond to the higher recording density, there is a growing demand for a narrower track width of magnetic pole layers. However, when the track width of the magnetic pole layer becomes narrow, it becomes more difficult to secure a sufficient intensity of write fields. At the same time, the performance of a preamplifier for read and write operations of the thin-film magnetic head has been greatly improved, and thus, a larger write current can be input to an electromagnetic coil element for writing. The improvement on the performance of the preamplifier allows an improvement on the intensity of write fields while redeeming a problem of the narrower track width.

However, when the write current is increased under the narrower track width of the magnetic pole layer, a leakage field from the magnetic pole layer also increases. As a result, it becomes highly probable that unnecessary writing or erasure to an adjacent track on the magnetic disk, which is a magnetic recording medium, is performed.

In particular, in radially inward and outward portions of the magnetic disk, a skew angle, an angle of the head to a track, becomes too large. As a result, the magnetic pole layer on the leading side is brought close to the adjacent track. Consequently, it becomes more probable that the leakage field from the magnetic pole layer on the leading side causes unnecessary, writing or erasure to the adjacent track. As a measures thereagainst, the saturation magnetic flux density of the magnetic pole layer on the leading side can be limited to decrease the leakage field. However, the limitation inevitably lowers the intensity of the write field itself.

As another effective measure, the width in the track width direction in the magnetic pole layer on the leading side can be made smaller. In this case, the width in the track width direction in the magnetic pole layer on the trailing side defines a track width in a recording layer on the magnetic disk, and needs to be set to a width of a predetermined size to obtain sufficient intensity of write fields and field gradient. Therefore, the width of the magnetic pole layer on the leading side needs to be smaller than that of the magnetic pole layer on the trailing side. However, the magnetic pole layer on the leading side is positioned on the side opposite to a stacking direction of the magnetic pole layer on the trailing side on the element formation surface of a substrate. Thus, it is very difficult to achieve a configuration of such widths while securing a size of each magnetic pole layer and accuracy of the mutual positional relations.

In this case, the width of the magnetic pole layer on the leading side needs to be set to a predetermined value with high accuracy by taking into consideration various parameters such as the thickness of the magnetic pole layer or the like. Conventionally, a guideline therefor, however, has not been proposed at all.

Further, not only in the thin-film magnetic head but also in a general thin-film element, controlling such that the width of the layer on the side opposite to the stacking direction (on the lower side) on the element formation surface of a substrate is made smaller, has been very difficult to achieve, though necessary in various element configurations.

BRIEF SUMMARY OF THE INVENTION

Therefore, an object of the present invention is to provide a manufacturing method of a thin-film element, capable of controlling such that a width of a layer on the side opposite to the stacking direction (on the lower side) in a stacked structure formed on the element formation surface of a substrate is made smaller.

Another object of the present invention is to provide a manufacturing method of a thin-film magnetic head, capable of making smaller a width in the track width direction of a magnetic pole layer on the leading side than that of the magnetic pole layer on the trailing side, while setting the width in the track width direction of the magnetic pole layer on the trailing side to a predetermined value with high accuracy.

Still another object of the present invention is to provide a thin-film magnetic head with which unnecessary writing and erasure to an adjacent track caused due to a leakage field is prevented; an HGA provided with the thin-film magnetic head; and a magnetic disk drive apparatus provided with the HGA.

Before the present invention is explained, terms used here are defined. In a stacked structure of a magnetic head element formed on the element formation surface of an substrate, components closer to the substrate side in relation to a reference layer are referenced as components positioned "under" the reference layer or "lower" than the reference layer. Components closer to the side on the stacked direction in relation to the reference layer are referenced as components positioned "on" the reference layer or "upper" than the reference layer. For example, "lower magnetic pole layer is positioned on an insulating layer" means that the lower magnetic pole layer is positioned closer to the side on the stacking direction in relation to the insulating layer.

According to the present invention, a manufacturing method of a thin-film element having a lower layer with a narrower width is provided, which comprises steps of:

forming a first film on/above an element formation surface of a substrate;

forming a second film on the first film;

forming a second layer having a width $W_{UP}$ obtained by trimming the second film by means of ion beam etching or reactive ion etching;

forming a mask film having a smaller etching rate than the first film so as to cover the second layer;

forming a pattern having a width $W_{TR}$ larger than the width $W_{UP}$, obtained by collectively trimming the mask film covering the second layer and at least an upper portion of the first film by means of ion beam etching or reactive ion etching; and thereafter or at the same time, forming a first layer having a width $W_{LO}$ smaller than the width $W_{UP}$ or having a portion with a width $W_{LO}$ smaller than the width $W_{UP}$, obtained by trimming the first film without changing the width $W_{UP}$ of the second layer by means of ion beam etching or reactive ion etching.

In the manufacturing method of the thin-film element according to the present invention, the mask film having a smaller etching rate than the first film is formed so as to cover the second layer. by using the mask film, the first film can be trimmed without changing the width $W_{UP}$ of the second layer. As a result, the width $W_{LO}$ of the lower layer on the side opposite to the stacking direction in the stacked structure on/above the element formation surface of the substrate can be controlled to become smaller.

According to the present invention, a manufacturing method of a thin-film magnetic head is further provided, which comprises steps of:

forming: a lower magnetic film; and a write gap film made of a non-magnetic material on the lower magnetic film, on/above an element formation surface of a substrate;

forming an upper magnetic pole film on the write gap film;

forming an upper magnetic pole layer having a width $W_{UP}$ in a track width direction obtained by trimming the upper magnetic pole film by means of ion beam etching or reactive ion etching:

forming a non-magnetic mask film made of a non-magnetic material having a smaller etching rate than the lower magnetic film and the write gap film so as to cover the upper magnetic pole layer;

forming a pattern having a width $W_{TR}$ in the track width direction larger than the width $W_{UP}$, obtained by collectively trimming the non-magnetic mask film, the write gap film and at least an upper portion of the lower magnetic film by means of ion beam etching or reactive ion etching; and thereafter or at the same time, forming: a write gap layer having a width $W_{LO}$ in the track width direction smaller than the width $W_{UP}$; and a lower magnetic layer having a portion with a width $W_{LO}$ in the track width direction smaller than the width $W_{UP}$, obtained by trimming the lower magnetic layer and the write gap layer without changing the width $W_{UP}$ of the upper magnetic pole layer by means of ion beam etching or reactive ion etching.

According to the present invention, a manufacturing method of a thin-film magnetic head is further provided, which comprises steps of:

forming a lower magnetic film on/above an element formation surface of a substrate;

forming: a write gap film made of a non-magnetic material; and an upper magnetic pole film oil the write gap film, on the lower magnetic film;

forming a write gap layer and an upper magnetic pole layer having a width $W_{UP}$ in a track width direction obtained by trimming the write gap film and the upper magnetic pole film by means of ion beam etching or reactive ion etching;

forming a non-magnetic mask film made of a non-magnetic material having a smaller etching rate than the lower magnetic film so as to cover the write gap layer and the upper magnetic pole layer;

forming a pattern having a width $W_{TR}$ in the track width direction larger than the width $W_{UP}$, obtained by collectively trimming the non-magnetic mask film and at least an upper portion of the lower magnetic film by means of ion beam etching or reactive ion etching; and thereafter or at the same time, forming a lower magnetic layer having a portion with a width $W_{LO}$ in the track width direction smaller than the width $W_{UP}$, obtained by trimming the lower magnetic film without changing the width $W_{UP}$ of the a write gap layer and the upper magnetic pole layer by means of ion beam etching or reactive ion etching.

In these manufacturing methods according to the present invention, it is possible to set the width $W_{UP}$ in the track width direction of the upper magnetic pole layer, which is magnetic pole layer on the trailing side (on the stacking direction side in the stacked structure), to a predetermined value with high accuracy. In addition, by using the non-magnetic mask film, the width $W_{LO}$ of the lower magnetic pole layer, which is a magnetic pole layer on the leading side (that corresponds to the side opposite to the stacking direction in the stacked structure), in the track width direction can be made smaller than the width $W_{UP}$. As a result, a thin-film magnetic head can be obtained, with which a sufficient write field can be secured and unnecessary writing or erasure to an adjacent track caused due to a leakage field is prevented.

In the manufacturing methods according to the present invention, it is preferable that the lower magnetic film is formed in such a way that a lower yoke film, and a lower magnetic pole film having a higher saturation magnetic flux density than the lower yoke film are sequentially stacked, and the lower magnetic layer comprises: a lower yoke layer; and a lower magnetic pole layer having a higher saturation magnetic flux density than the lower yoke layer, formed on the lower yoke layer.

In the manufacturing methods, it is also preferable that the upper magnetic pole film is formed of: a first upper magnetic pole film; and a second upper magnetic pole film formed on the first upper magnetic pole film by means of a plating method in which the first upper magnetic pole film is used as an electrode and the upper magnetic pole layer comprises: a first upper magnetic pole layer; and a second upper magnetic pole layer formed on the first upper magnetic pole layer.

Furthermore, the non-magnetic mask film is preferably an alumina film or an aluminum nitride film.

According to the present invention, a manufacturing method of a thin-film magnetic head is further provided, which comprises steps of:

forming a main magnetic pole film on a first non-magnetic layer formed on/above an element formation surface of a substrate;

forming a photoresist pattern film used as a mask on the main magnetic pole film;

forming a first pattern having a width $W_{TE}$ in a track width direction, obtained by collectively trimming the photoresist pattern film and at least an upper portion of the main magnetic pole film by means of ion beam etching or reactive ion etching;

forming a non-magnetic mask film made of a non-magnetic material having a smaller etching rate than the main magnetic pole film so as to cover the first pattern;

forming a second pattern having a width $W_{PA}$ larger than the width $W_{TE}$, in a track width direction, obtained by collectively trimming the main magnetic pole film and a non-magnetic mask film surrounding the main magnetic pole film by means of ion beam etching or reactive ion etching at least until an upper surface of the first non-magnetic layer is reached;

thereafter or at the same time, forming: side surfaces, having a bevel angle, of the main magnetic pole layer; and a lowest surface of the main magnetic pole layer having a width $W_{LE}$, smaller than the width $W_{TE}$, in a track width direction, by undercutting the second pattern without changing an upper portion having the width $W_{TE}$ of the main magnetic pole film by means of ion beam etching or reactive ion etching;

forming a second non-magnetic film so as to cover the undercut second pattern; and forming a main magnetic pole layer surrounded by a first and a second non-magnetic layers by polishing the second non-magnetic film and an upper portion of the main magnetic pole film.

In the manufacturing method according to the present invention, it is possible to set the width $W_{TE}$ that corresponds to the length of the edge on the trailing side (on a stacking direction in the stacked structure) in the shape on the head end surface of the main magnetic pole layer to a predetermined value with high accuracy. Further, it is possible that the width $W_{LE}$ that corresponds to the length of the edge on the leading side (on opposite side to the stacking direction) is made smaller than the width $W_{TE}$. That is, it is possible to obtain a shape of an approximate inverted trapezoid in which the long edge is on the trailing side. As a result, a sufficient write field is secured, and at the same time, the bevel angle is imparted to the side surfaces, thereby a thin-film magnetic head can be obtained, with which unnecessary writing or erasure to an adjacent track caused due to a leakage field is prevented.

In the manufacturing method according to the present invention, the non-magnetic mask film is preferably an alumina film, an aluminum nitride film or a silicon carbide film.

According to the present invention, a thin-film magnetic head is further provided, which comprises an electromagnetic coil element including:

a lower yoke layer formed on/above an element formation surface of a substrate;

a lower magnetic pole layer formed on an end portion on a head end surface side of the lower yoke layer;

a first upper magnetic pole layer;

a second upper magnetic pole layer formed on the first upper magnetic pole layer;

an upper yoke layer, an end portion of which on the head end surface side is positioned on the second upper magnetic pole layer;

a write gap layer an end portion of which on the head end surface side is sandwiched between the lower magnetic pole layer and the first upper magnetic pole layer; and a write coil layer formed so as to pass at least between the lower yoke layer and the upper yoke layer, saturation magnetic flux densities of the lower magnetic pole layer and the first upper magnetic pole layer being at least 2.0 tesla or more, a width $W_{LO}$ of the lower magnetic pole layer in a track width direction being smaller than a width $W_{UP}$ of the first upper magnetic pole layer and the second upper magnetic pole layer in a track width direction, and a half of a difference between the width $W_{UP}$ and the width $W_{LO}$, that is, $\Delta W/2 = 0.5(W_{UP} - W_{LO})$ (micrometer), satisfying a relationship of:

$$T_{LP} \leq (42 L_G \cdot \tan \theta_{SK})^{-1} \cdot (a(\Delta W/2)^3 + b(\Delta W/2)^2 + c(\Delta W/2) + d),$$

where $T_{LP}$ (micrometer) is a thickness of the lower magnetic pole layer, $L_G$ (micrometer) is a thickness of the write gap layer, $\theta_{SK}$ (degree) is a skew angle to a track of the head, a=3333355.0, b=−7500.0, c=14.0, and d=0.1.

In the thin-film magnetic head having the parameters that satisfy the above-described conditional expression, even when the skew angle of the head becomes larger than 0 (zero), the effective width EW of the write field does not increase. That is, by using the thin-film magnetic head according to the present invention, the unnecessary writing or erasure to the adjacent track caused due to the leakage field from the magnetic pole layer on the leading side is surely prevented.

According to the present invention, a head gimbal assembly is further provided, which comprises the above-described head and a support structure for supporting the thin-film magnetic head.

According to the present invention, a magnetic disk drive apparatus is further provided, which comprises: at least one head gimbal assembly above-described; at least one magnetic disk; and a recording/reproducing means for controlling read and write operations of the thin-film magnetic head to the at least one magnetic disk.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIGS. 5a and 5b show schematic views illustrating the configuration of the end on the head end surface of the electromagnetic coil element in FIG. 4a;

FIGS. 7a to 7f show cross-sections taken along line A-A in FIG. 3 for explaining one embodiment of a formation process of the MR effect element and the electromagnetic coil element shown in FIG. 4a;

FIGS. 8a to 8e show schematic views from the head end surface side, for explaining a formation process of the end of the upper and lower magnetic layers in the electromagnetic coil element in FIG. 4a;

DETAILED DESCRIPTION OF THE INVENTION

Figure 1:
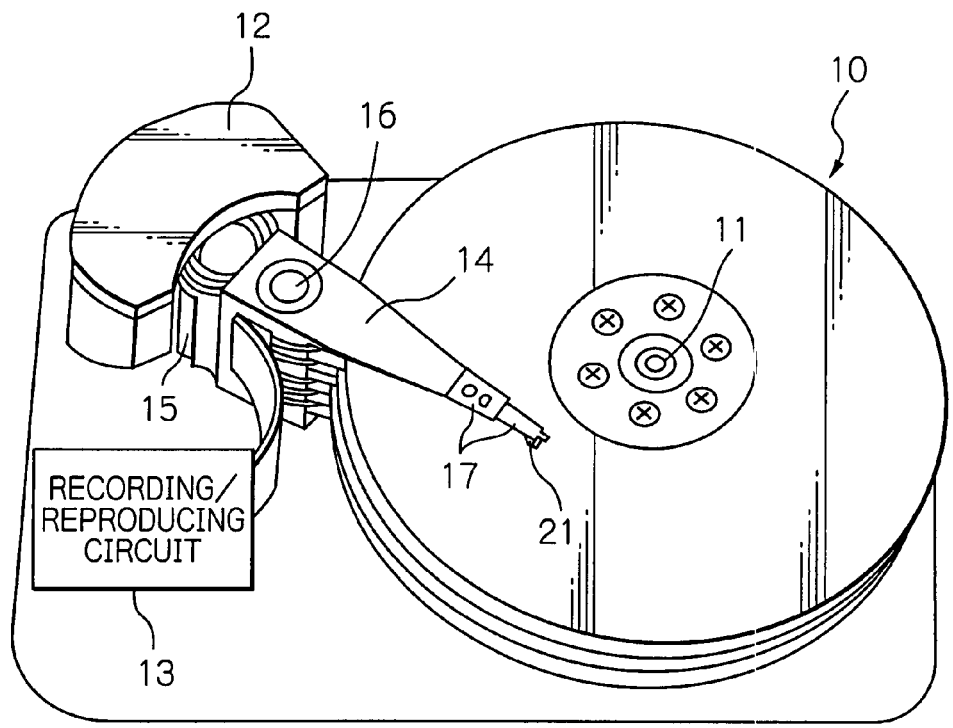
FIG. 1 shows a perspective view schematically illustrating the configuration of substantial parts of one embodiment of a magnetic disk drive apparatus according to the present invention.

FIG. 1 shows a perspective view schematically illustrating the configuration of substantial parts of one embodiment of a magnetic disk drive apparatus according to the present invention.

In FIG. 1, the reference numeral 10 denotes a plurality of magnetic disks, as magnetic recording media, rotating around a rotary shaft of a spindle motor 11. The reference numeral 12 denotes an assembly carriage device for positioning a thin-film magnetic head (slider) 21 on a track. The reference numeral 13 denotes a recording/reproducing circuit for controlling writing and reading operations of the thin-film magnetic head.

In the assembly carriage device 12, a plurality of drive arms 14 are provided. These drive arms 14 are pivotable around a pivot bearing axis 16 by a voice coil motor (VCM) 15 and stacked in the direction along the axis 16. At the distal end of each drive arm 14, HGA 17 is mounted. At each HGA 17, a thin-film magnetic head (slider) 21 is arranged so as to face the surface of each magnetic disk 10. The magnetic disks 10, the drive arms 14, the HGAs 17, and the sliders 21 may be singular.

Although not shown, the recording/reproducing circuit 13 is provided with: a recording/reproducing control LSI (control LSI); a write gate for receiving record data from the recording/reproducing control LSI; a write circuit for outputting a signal from the write gate to an electromagnetic coil element for writing described later; a constant current circuit for supplying a sense current to a magnetoresistive (MR) effect element for reading described later; an amplifier for amplifying an element output voltage of the MR effect element; and a demodulator circuit for outputting reproduced data to the recording/reproducing control LSI.

Figure 2:
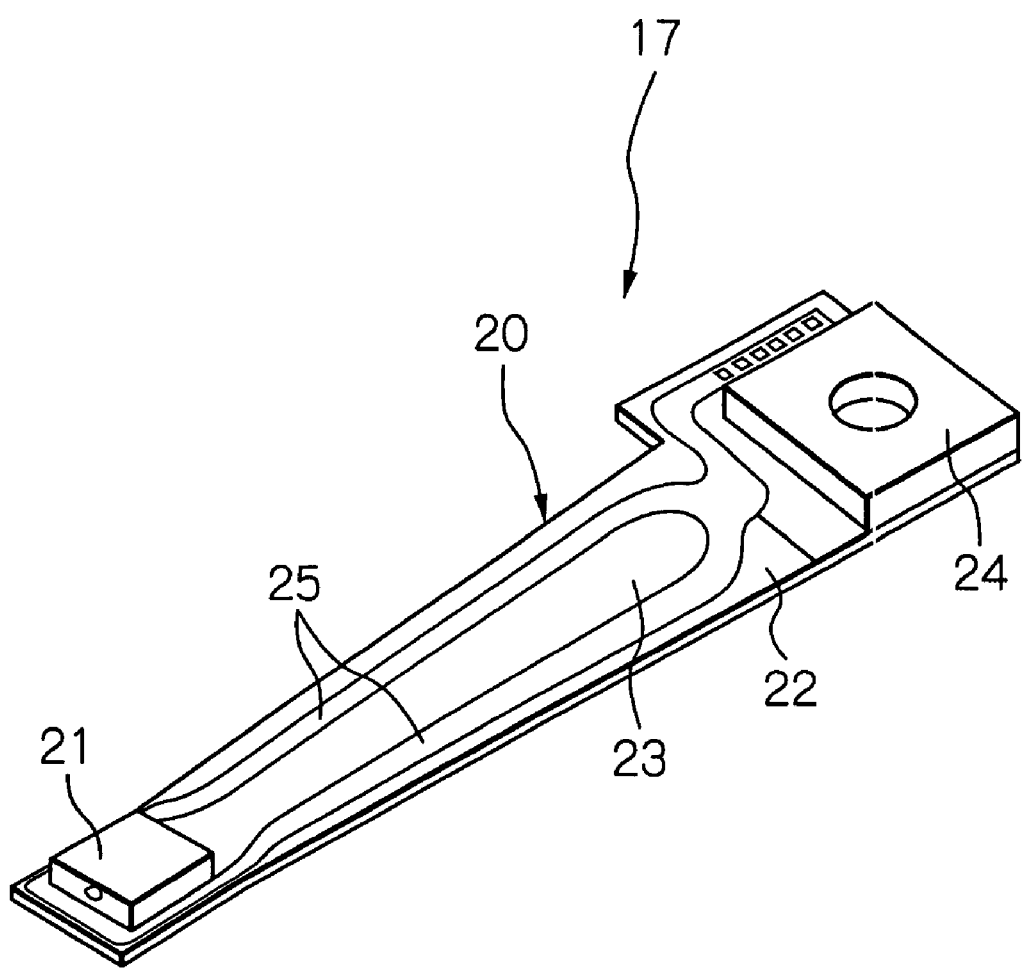
FIG. 2 shows a perspective view illustrating one embodiment of the HGA according to the present invention.

FIG. 2 shows a perspective view illustrating one embodiment of the HGA according to the present invention.

As shown in FIG. 2, the HGA 17 has a structure in which the slider 21 having a magnetic head element is fixed to the distal end of a suspension 20, one end of a wiring member 25 is electrically connected with terminal electrodes of the slider 21.

The suspension 20 is configured mainly by a load beam 22; an flexure 23 having elasticity fixed on and supported by the load beam 22; a base plate 24 arranged in the base of the load beam 22; and a wiring member 25 arranged on the flexure 23 and formed of a lead conductor and connection pads electrically connected to both ends of the lead conductor. Although not shown, a head drive IC chip may be mounted in a middle of the suspension 20.

Figure 3:
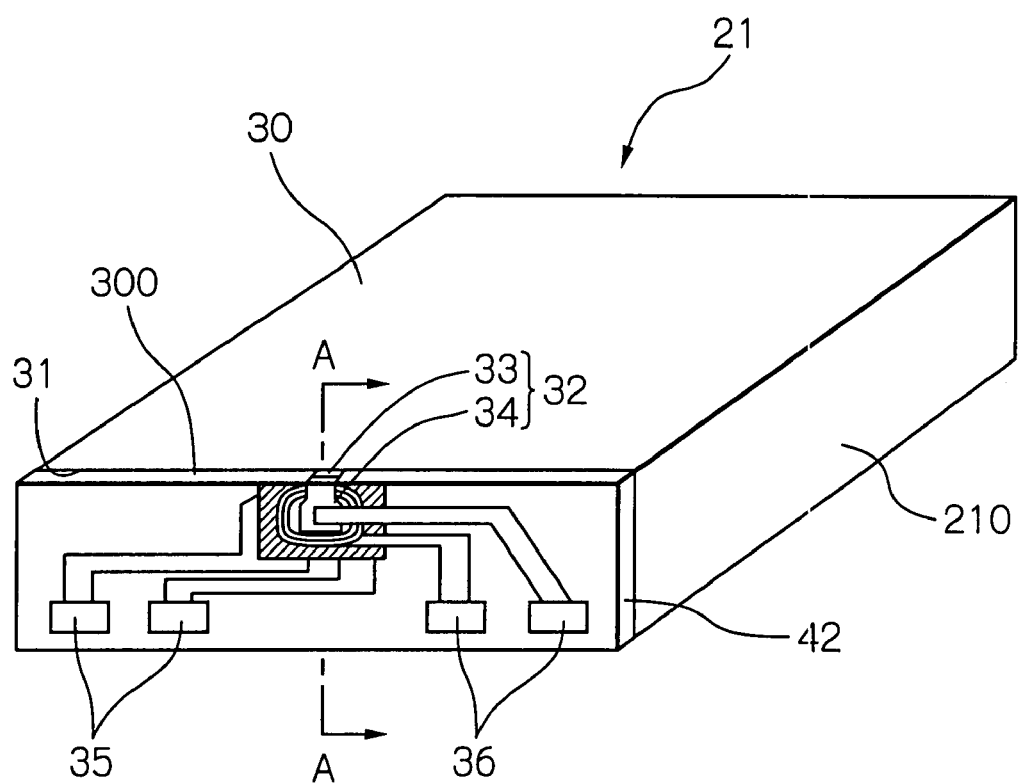
FIG. 3 shows a perspective view schematically illustrating one embodiment of the thin-film magnetic head mounted at the distal end of the HGA in FIG. 2.

FIG. 3 shows a perspective view schematically illustrating one embodiment of the thin-film magnetic head (slider) 21 mounted at the distal end of the HGA in FIG. 2.

As shown in FIG. 3, the thin-film magnetic head (slider) 21 according to the embodiment includes: a slider substrate 210 having an air bearing surface (ABS) 30 machined so as to obtain the appropriate amount of flying height and an element formation surface 31; a magnetic head element 32 formed on the element formation surface 31; and signal electrodes 35 and 36 each formed of a pair of electrodes exposed from the layer surface of an overcoat layer 42 formed on the element formation surface 31. Here, the magnetic head element 32 is configured with an MR effect element 33 for reading and an electromagnetic coil element 34 for writing. The signal electrodes 35 and 36 are connected to the MR effect element 33 and the electromagnetic coil element 34, respectively.

In the MR effect element 33 and the electromagnetic coil element 34, one ends of the elements reach a head end surface 300 on the ABS 30 side. While facing these ends to the magnetic disk, reading is performed by receiving a signal field, and writing is performed by applying a signal field.

Figure 4A:
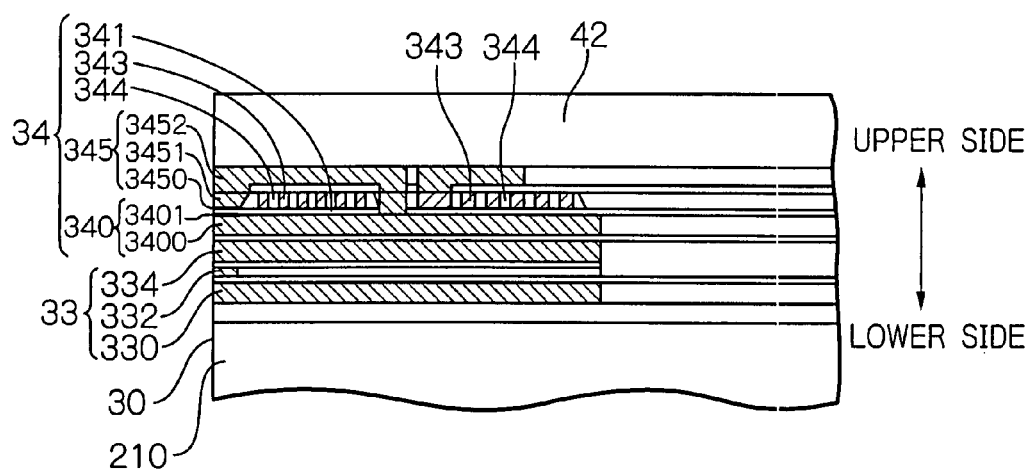
FIG. 4a shows a cross section along line A-A in FIG. 3 illustrating the configuration of substantial parts of the thin-film magnetic head for longitudinal magnetic recording according to the present invention.
Figure 4B:
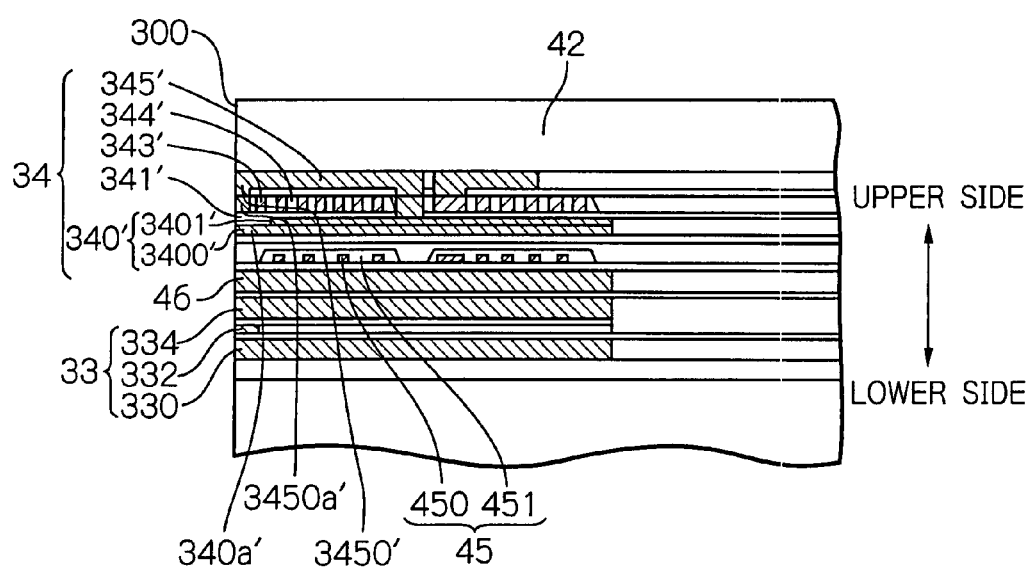
FIG. 4b shows a cross section along line A-A in FIG. 3 illustrating the configuration of substantial parts of the thin-film magnetic head for perpendicular magnetic recording according to the present invention.

FIG. 4a shows a cross section along line A-A in FIG. 3 illustrating the configuration of substantial parts of the thin-film magnetic head for longitudinal magnetic recording according to the present invention. FIG. 4b shows a cross section along line A-A in FIG. 3 illustrating the configuration of substantial parts of the thin-film magnetic head for perpendicular magnetic recording according to the present invention. In FIG. 4b, components common or corresponding to those in the magnetic head element 32 in FIG. 4a are shown using the same reference numerals as those in FIG. 4a, and the explanation will not be repeated.

In FIG. 4, the reference numeral 210 denotes a slider substrate having the ABS 30 facing the surface of the magnetic disk. On the element formation surface 31, which is one of the side surfaces when placed with the ABS 30 at bottom, mainly formed is the MR effect element 33 for read operation, the electromagnetic coil element 34 for write operation, and the overcoat layer 42 for protecting these elements.

The MR effect element 33 includes an MR effect multilayer 332; and a lower shield layer 330 and an upper shield layer 334 arranged in positions where the MR effect multilayer 332 is sandwiched therebetween. The MR effect multilayer 332 includes a Current-In-Plane (CIP) giant magnetoresistive (GMR) multilayered film, a Current-Perpendicular-to-Plane (CPP) GMR multilayered film, or a tunnel magnetoresistive (TMR) multilayered film, and receives a signal field from the magnetic disk with very high sensitivity. The upper and lower shield layers 334 and 330 prevent the MR effect multilayer 332 from receiving an external field, which results in noise.

When the MR effect multilayer 332 includes the CIP-GMR multilayered film, upper and lower shield gap layers for insulating are arranged between each of the upper and lower shield layers 334 and 330 and MR effect multiplayer 332. Further, an MR lead conductor layer for supplying a sense current to the MR effect multilayer 332 and for retrieving reproduced output is formed. On the other hand, when the MR effect multilayer 332 includes the CPP-GMR multilayered film or the TMR multilayered film, the upper and lower shield layers 334 and 330 function as upper and lower electrodes respectively. In this case, the upper and lower shield gap layers and the MR lead conductor layer are not necessary and omitted. However, insulating layers are formed between the shield layers opposite to the head end surface 300 of the MR effect multilayer 332. Further, bias layers for applying a bias field to stabilize the magnetic domains of the MR effect multilayer 332 may be provided on both sides of the MR effect multilayer 332 in the track width direction.

The electromagnetic coil element 34 is used for longitudinal magnetic recording in this embodiment, and includes a lower magnetic layer 340, a write gap layer 341, a write coil layer 343, a coil insulating layer 344, and an upper magnetic layer 345. The write coil layer 343 is formed so as to pass at least between the lower magnetic layer 340 and the upper magnetic layer 345. The lower magnetic layer 340 and the upper magnetic layer 345 serve as a magnetic conducting path of a magnetic flux excited by the write coil layer 343. Here, the lower magnetic layer 340 includes a lower yoke layer 3400 and a lower magnetic pole layer 3401 that is positioned on the end portion on the head end surface 300 side of the lower yoke layer 3400 and has a saturation magnetic flux density of at least 2.0 tesla (T) or more, larger than that of the lower yoke layer 3400. The upper magnetic layer 345 includes a first upper magnetic pole layer 3450 and a second upper magnetic pole layer 3451 formed on the upper magnetic pole layer 3450, both of which define an upper magnetic pole layer; and an upper yoke layer 3452, an end portion on the head end surface 300 side of which is positioned on the second upper magnetic pole layer 3451. Here, the saturation magnetic flux density of the first upper magnetic pole layer 3450 is larger than that of the second upper magnetic pole layer 3451 and the upper yoke layer 3452, and is at least 2.0 T or more.

The lower magnetic pole layer 3401 and the first upper magnetic pole layer 3450 sandwich the end portion on the head end surface 300 side of the write gap layer 341. A magnetic leakage field from the end position of the write gap layer 341 causes writing to the magnetic disk for longitudinal magnetic recording. It is noted that the end of the magnetic disk side of the lower magnetic pole layer 3401 and the first upper magnetic pole layer 3450 reach the head end surface 300, and the head end surface 300 may be coated with diamond-like carbon (DLC) or the like, as a very thin protective layer. Although the write coil layer 343 is single layer in FIG. 4a, it may be two layers or more, or a helical coil.

Further, between the upper shield layer 334 and the lower magnetic layer 340, a non-magnetic layer, made of an insulating material or a metallic material or the like, for separating the MR effect element 33 and the electromagnetic coil element 34 is arranged. However, the non-magnetic layer is not always necessary, and when this layer is omitted, the upper shield layer may also serve the lower magnetic layer.

Next, using FIG. 4b, another embodiment of the thin-film magnetic head according to the present invention is explained.

In FIG. 4b, an electromagnetic coil element 34' is provided for perpendicular magnetic recording, and includes a main magnetic pole layer 340', a gap layer 341', a write coil layer 343', a coil insulating layer 344', and an auxiliary magnetic pole layer 345'. The main magnetic pole layer 340' serves as a magnetic conducting path for converging and guiding a magnetic flux excited by the write coil layer 343' to a perpendicular magnetic recording layer of the magnetic disk, and essentially consists of a main pole principal layer 3400' and a main pole support layer 3401'. Here, the length (thickness) of the main magnetic pole layer 340' in the layer thickness direction at an end portion 340a' on the head end surface 300 side is smaller, corresponding to the layer thickness of the main pole principal layer 3400' alone. As a result, it is possible to generate a minute write field that responds to a higher recording density.

The end portion on the head end surface 300 side of the auxiliary magnetic pole layer 345' is a trailing shield portion 3450', the cross-section of which is larger than other portions of the auxiliary magnetic pole layer 345'. The provision of the trailing shield portion 3450' allows a field gradient between an end portion 3450a' of the trailing shield portion 3450' and an end portion 340a' of the main magnetic pole layer 340' to be more steeper. As a result, the jitter of signal output becomes small, thereby reducing an error rate during reading operation. Although the write coil layer 343' is a single layer in FIG. 4b, it may be two layers or more, or a helical coil.

In FIG. 4b, between an MR effect element 33 and an electromagnetic coil element 34', an inter-element shield layer 46 and a backing coil portion 45 are further formed. The backing coil portion 45 is formed of a backing coil layer 450 and a backing coil insulating layer 451, and generates a magnetic flux for counteracting a magnetic flux loop generated from the electromagnetic coil element 34' and routed through the upper and lower shield layers within the MR effect element 33 to suppress a wide adjacent track erase (WATE) phenomenon which is an unnecessary operation of writing or erasure to the magnetic disk. The magnetic flux from the backing coil portion 45 influences also in a direction that weakens the write field. Therefore, in order to limit the influence within a permissive range, the number of wirings of the backing coil layer 450 is set to be equal to or less than that of the write coil layer 343'.

Figure 5A:
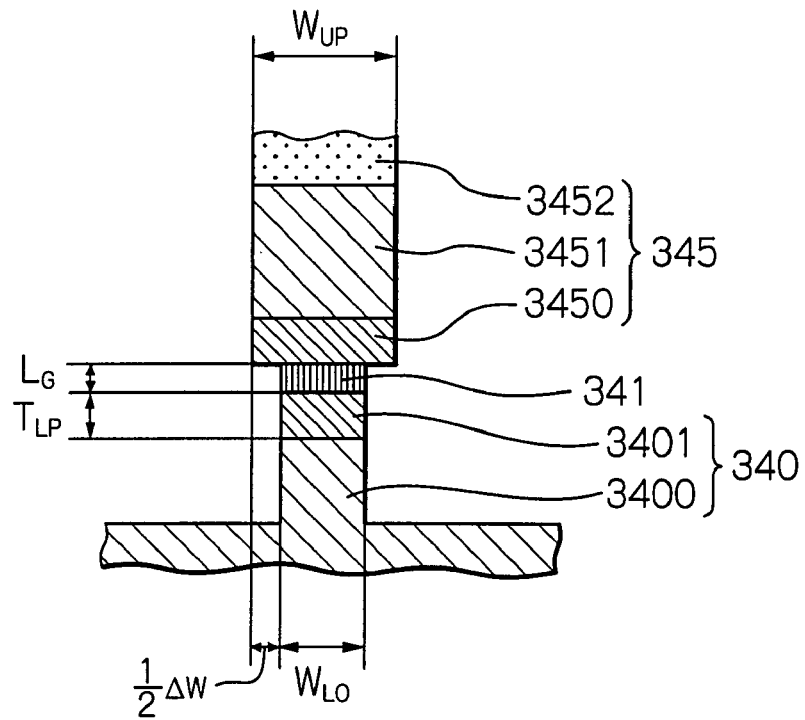
Figure 5B:
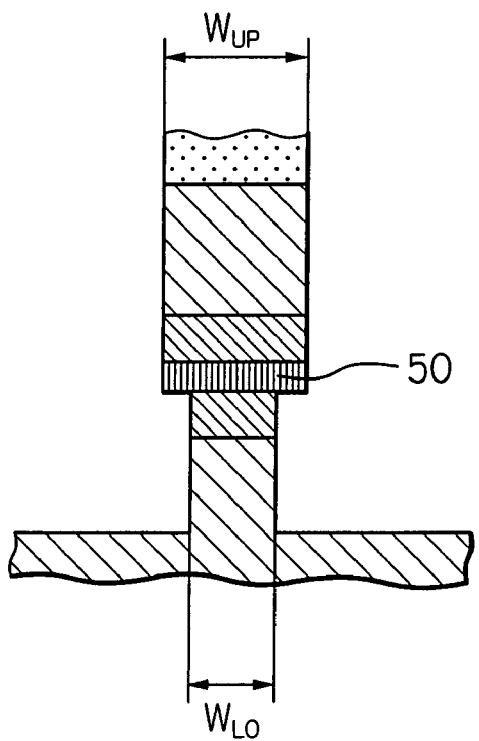
Figure 5C:
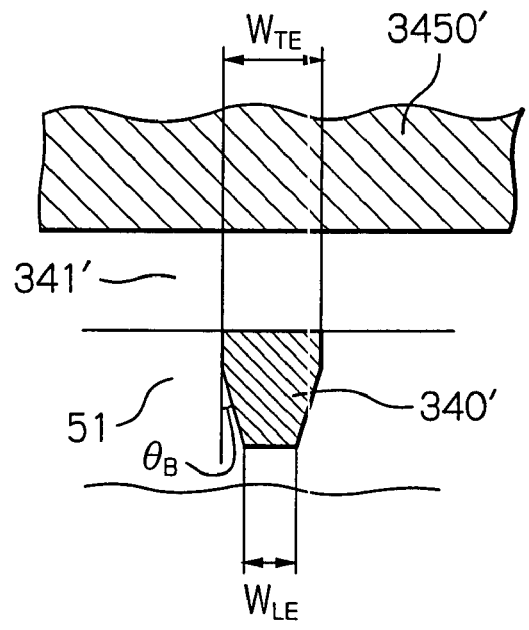
FIG. 5c shows a schematic view illustrating the configuration of the end on the head end surface of the electromagnetic coil element in FIG. 4b.

FIGS. 5a and 5b show schematic views illustrating the configuration of the end on the head end surface 300 of the electromagnetic coil element 34 in FIG. 4a. FIG. 5c shows a schematic view illustrating the configuration of the end on the head end surface 300 of the electromagnetic coil element 34' in FIG. 4b.

According to FIG. 5a, a portion of the lower yoke layer 3400, the lower magnetic pole layer 3401, and the write gap layer 341 have a width $W_{LO}$ in the track width direction, and the first upper magnetic pole layer 3450 and the second upper magnetic pole layer 3451 have a width $W_{UP}$ in the track width direction. Here, the width $W_{LO}$ is set to be smaller than the width $W_{UP}$. The width $W_{UP}$ and the width $W_{LO}$ are set such that half of the difference between the width $W_{UP}$ and the width $W_{LO}$, that is, $\Delta W/2 = 0.5(W_{UP} - W_{LO})$ (μm), satisfies the following conditional expression (1):

$$T_{LP} \leq (42 L_G \cdot \tan \theta_{SK})^{-1} \cdot (a(\Delta W/2)^3 + b(\Delta W/2)^2 + c(\Delta W/2) + d), \quad (1)$$

where $T_{LP}$ (μm) is a thickness of the lower magnetic pole layer 3401, $L_G$ (μm) is a thickness of the write gap layer 341, $\theta_{SK}$ (deg) is a skew angle of the head to the track, a=3333355.0, b=−7500.0, c=14.0, and d=0.1.

When the width $W_{UP}$ and the width $W_{LO}$ satisfy such relationship, unnecessary writing and erasure to the adjacent track caused due to a leakage field, which results from the skew angle that the head has, can be suppressed while securing a sufficient write field, as explained in detail later.

As shown in FIG. 5b, even when the width of the write gap layer 50 in the track width direction becomes $W_{UP}$, the above-described effect can be obtained when $\Delta W/2$ is set so as to satisfy the conditional expression (1). Although not shown, the width of the write gap layer in the track width direction may extend in a stacking direction from the width $W_{LO}$ of the lower magnetic pole layer to the width $W_{UP}$ of the upper magnetic pole layer. It is noted that in FIGS. 5a and 5b, a surrounding area of the end on the head end surface 300 of the electromagnetic coil element 34 is buried with a non-magnetic material such as $Al_2O_3$ (alumina) or $SiO_2$ (silicon dioxide).

In FIGS. 5a and 5b, the width $W_{UP}$ is about 0.1 to about 0.2 μm, for example. The width $W_{LO}$ is about 0.05 to about 0.18 μm, for example. The thickness $T_{LP}$ is about 0.1 to about 0.5 μm, for example. The thickness $L_G$ is about 0.01 to about 0.1 μm, for example. $\theta_{SK}$ is about 5 to about 20 deg, for example.

According to FIG. 5c, the main magnetic pole layer 340' has an approximate trapezoid shape on the head end surface 300. Here, to prevent unnecessary writing to and erasure from the adjacent track caused by the skew angle of the head, a bevel angle $\theta_B$ is provided. The bevel angle $\theta_B$ is about 15 degrees, for example. The edge on the trailing side of the shape on the head end surface 300 is longer than the edge on the leading side, and faces the trailing shield portion 3450' via the gap layer 341', thereby forming a trailing shield gap. Here, the length $W_{TE}$ of the edge on the trailing side, which defines the longer edge of the trapezoid, is about 100 to about 300 nm, for example. The length $W_{LE}$ of the edge on the leading side, which defines the shorter edge of the trapezoid, is about 50 to 180 nm, for example. The distance between the longer and shorter edges, which defines the height of the trapezoid, is about 120 to 250 nm, for example.

On both sides in the track width direction of the main magnetic pole layer 340' and below the layer 340', a non-magnetic layer 51 made of $Al_2O_3$, for example, is formed. Therefore, when viewed from the head end surface 300 side, all the edges of the main magnetic pole layer 340' are surrounded by the non-magnetic material, that is, magnetically isolated.

Figure 6:
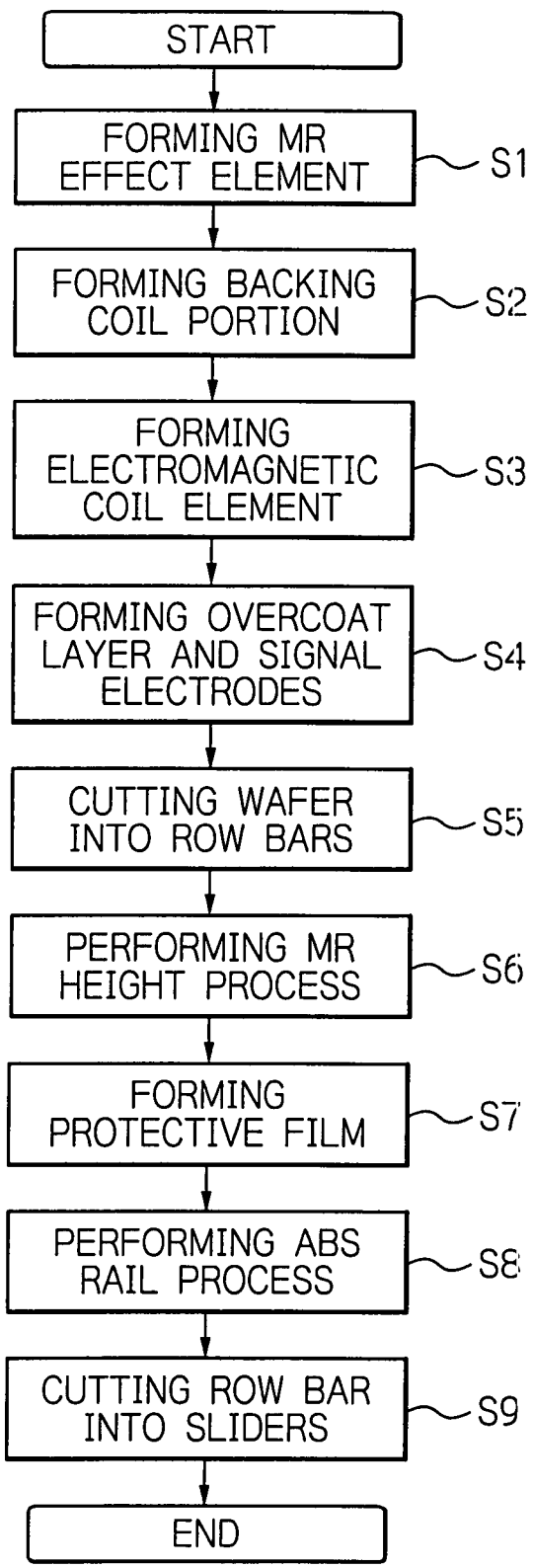
FIG. 6 shows a flowchart schematically illustrating one embodiment of a manufacturing method of the thin-film magnetic head according to the present invention.

FIG. 6 shows a flowchart schematically illustrating one embodiment of a manufacturing method of the thin-film magnetic head according to the present invention.

According to FIG. 6, firstly, on the element formation surface of a wafer substrate for slider, the MR effect element for reading data is formed (step S1), and next, the backing coil portion is formed (step S2). Here, the backing coil portion is a component of the thin-film magnetic head for perpendicular magnetic recording, and is omitted when the thin-film magnetic head for longitudinal magnetic recording is manufactured. Thereafter, the electromagnetic coil element for writing data is formed (step S3), and further, the overcoat layer and the signal electrodes are formed (step S4). Through these steps, a thin-film wafer process for forming the magnetic head element provided with the MR effect element and the electromagnetic coil element on the wafer substrate is completed.

On the element formation surface of the thin-film magnetic head wafer, that is, a wafer substrate on which the thin-film wafer process is completed, a number of magnetic head element patterns are formed and aligned in a matrix manner. The magnetic head element patterns are portions to become the magnetic head element and signal electrodes in each slider formed through a machine process explained later.

Subsequently, the thin-film magnetic head wafer is bonded to a jig for cutting using resin or the like and is cut into row bars, in each of which a plurality of magnetic head element patterns are aligned (step S5). Next, the row bar is bonded to a jig for polishing using resin or the like, and polishing is performed as an MR height process to the end surface which serves as the ABS side of the row bar (step S6). The MR height process is performed until the magnetic head element is exposed to the head end surface and the MR effect multilayer of the MR effect element reaches a predetermined MR height. Thereafter, on the polished head end surface, the protective layer formed of diamond-like carbon (DLC), for example, is formed (step S7). Next, the row bar with the protective layer is bonded to a jig for forming rails using resin or the like, and the head end surface to be the ABS is processed so that rails are formed thereon using a photolithography method, an ion beam etching method, or the like (step S8). Thereafter, the row bar is bonded to a jig for cutting using resin or the like. After grooves for cutting easily are formed, the row bar is cut to be separated into individual sliders (step S9). Through these steps, the machine process for forming the slider is ended, thereby completing the manufacturing process of the thin-film magnetic head.

FIGS. 7a to 7f show cross-sections taken along line A-A in FIG. 3 for explaining one embodiment of a formation process of the MR effect element and the electromagnetic coil element shown in FIG. 4a.

Figure 7A:
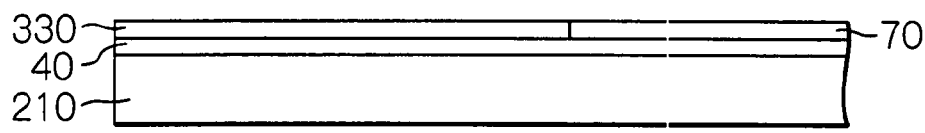

Firstly, as shown in FIG. 7a, on the slider substrate (wafer substrate) 210 formed of AlTiC ($Al_2O_3$—TiC), for example, formed is an underlying insulating layer 40 with thickness of approximately 0.1 to 5 μm, made of $Al_2O_3$, $SiO_2$ or the like by using, for example, a sputtering method. Subsequently, on the underlying insulating layer 40, formed is the lower electrode layer 330 with thickness of approximately 0.5 to 3 μm, made of NiFe, CoFeNi, CoFe, FeN, or FeZrN or the like, or a multilayered film comprised of these materials by using, for example, a frame plating method. Thereafter, by using a sputtering method, for example, an insulating film comprised made of $Al_2O_3$, $SiO_2$, or the like is deposited, and the resultant film is planarized by using a chemical mechanical polishing (CMP), or the like, to form a planarized layer 70.

Figure 7B:
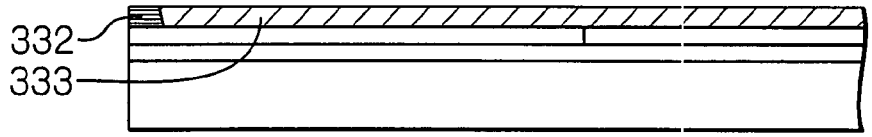

Subsequently, as shown in FIG. 7b, on the lower shield layer 330, the MR effect multilayer 332 and an insulating layer 333 are formed. Further, although not shown, a bias insulating layer and a bias layer may be formed. When the MR effect multilayer 332 includes the TMR effect multilayered film, for example, the MR effect multilayer 332 is formed in such a way that an antiferromagnetic layer; a magnetic pinned layer in which magnetization direction is pinned by the antiferromagnetic layer; a tunnel barrier layer formed of a non-magnetic dielectric material; and a magnetic free layer that is tunnel exchange-coupled to the magnetic pinned layer via the tunnel barrier layer are sequentially stacked.

Figure 7C:
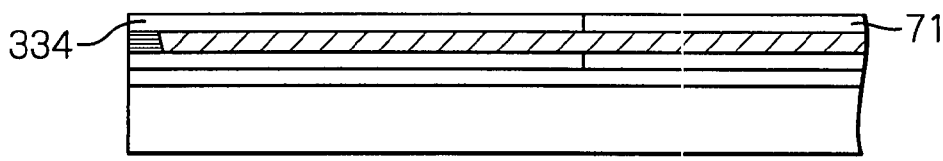

Subsequently, as shown in FIG. 7c, on the insulating layer 333 and the MR effect multilayer 332, formed is the upper electrode layer 334 with thickness of approximately 0.5 to 3 μm, made of NiFe, CoFeNi, CoFe, FeN, or FeZrN or the like, or a multilayered film comprised of these materials by using, for Example, a frame plating method. Through these processes, the formation of the MR effect element 33 is completed. Thereafter, an insulating layer made of $Al_2O_3$, $SiO_2$, or the like, is deposited by using a sputtering method, for example, and the resultant layer is planarized by CMP or the like to form a planarized layer 71.

Figure 7D:
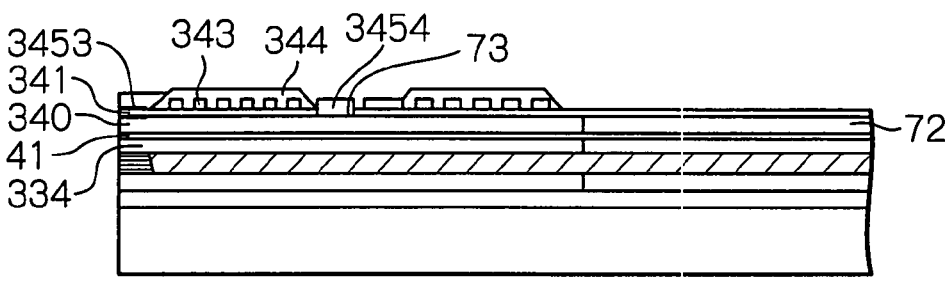

Next, as shown in FIG. 7d, on the upper electrode layer 334, a non-magnetic layer 41 with thickness of approximately 0.1 to 0.5 μm, made of an insulating material such as $Al_2O_3$, $SiO_2$, AlN (aluminum nitride) or DLC, for example, or a metallic material such as Ti, Ta, or Pt, for example, by, for example, using a sputtering method, a chemical vapor deposition (CVD) method is formed to separate the MR effect element 33 from the electromagnetic coil element 34 formed later. Subsequently, on the non-magnetic layer 41, formed is the lower magnetic layer 340 with thickness of approximately 0.5 to 3 μm, made of NiFe, CoFeNi, CoFe, FeN, or FeZrN, for example, or a multilayered film comprised of these materials by using, for example, a frame plating method. Here, the lower magnetic layer 340 is configured of the lower yoke layer and the lower magnetic pole layer, and the formation method of this configuration will be explained in detail later using FIG. 8. Thereafter, an insulating layer made of $Al_2O_3$, $SiO_2$, for example, is formed by a sputtering method, for example, and the resultant layer is deposited by using CMP, for example, to form a planarized layer 72.

Subsequently, as shown in FIG. 7d, formed is the write gap layer 341 with thickness of approximately 0.01 to 0.1 μm, made of an insulating material such as $Al_2O_3$, $SiO_2$, AlN or DLC by using, for example, a sputtering method, a CVD method. Thereafter, a portion of the write gap layer 341 is removed by using a dry-etching method or the like such as an ion milling method, a reactive ion etching (RIE) method via a resist mask pattern to expose the lower magnetic layer 340, thereby forming a back-gap portion 73. Subsequently, on the write gap layer 341, formed is the write coil layer 343 with thickness of approximately 1 to 5 µm, made of Cu, for example, by using, for example, a frame plating method.

Subsequently, as shown in FIG. 7d, the coil insulating layer 344 with thickness of approximately 0.5 to 7 µm, made of, for example, a heat-cured novolak type resist is formed by using, for example, a photolithography method so as to cover the write coil layer 343. Subsequently, on the write gap layer 431, formed are an upper magnetic pole layer 3453 and a back-contact magnetic pole layer 3454 with thickness of approximately 0.5 to 3 µm, made of NiFe, CoFeNi, CoFe, FeN, or FeZrN or the like, or a multilayered film comprised of these materials by using, for example, a frame plating method. Here, the upper magnetic pole layer 3453 is configured with the first and second upper magnetic pole layers, and the formation method of this configuration will be explained in detail later using FIG. 8.

Figure 7E:
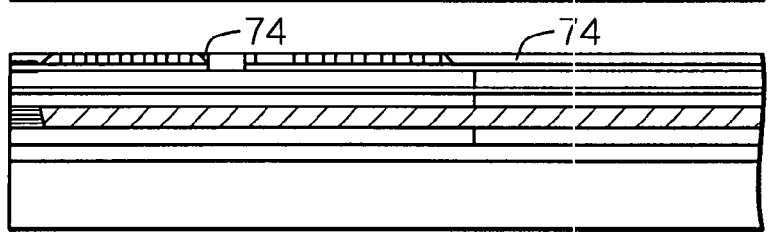
Figure 7F:
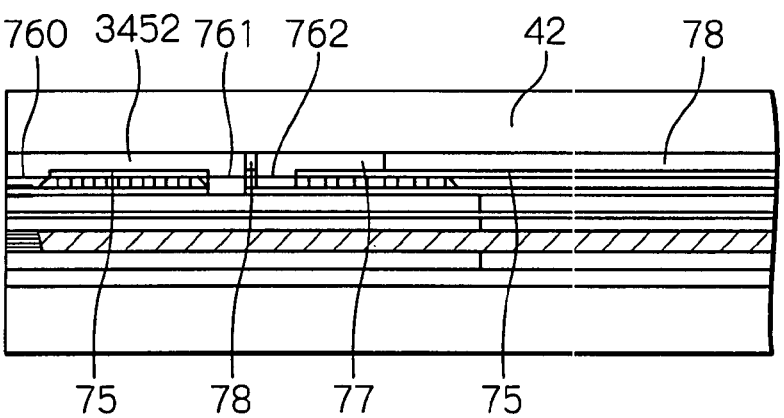

Thereafter, as shown in FIG. 7e, an insulating layer made of $Al_2O_3$, $SiO_2$, for example, is deposited by using a sputtering method, for example, and the resultant layer is planarized by CMP, for example, to form a planarized layer 74. Subsequently, as shown in FIG. 7f, an insulating layer 75 made of $Al_2O_3$, $SiO_2$, for example, is formed by a sputtering method or a CVD method, for example. Thereafter, an underlying bed is exposed by using a dry-etching method or the like such as an ion milling method, a reactive ion etching method via a resist mask pattern to form an upper magnetic pole layer-yoke junction 760, a back-contact magnetic pole layer-yoke junction 761, and a coil lead portion 762.

Subsequently, as also shown in FIG. 7f, formed are the upper yoke layer 3452 and a coil lead layer 77 with thickness of approximately 0.5 to 3 µm, made of NiFe, CoFeNi, CoFe, FeN, or FeZrN or the like, or a multilayered film comprised of these materials by using, for example, a frame plating method. However, the coil lead layer 77 may be separately formed of a material such as Cu by using, for example, a frame plating method. Through the above-described processes, the upper magnetic pole layer 3453, the back contact magnetic pole layer 3454, and the upper yoke layer 3452 are formed, and thus, the formation of the upper magnetic layer 345 is completed.

Subsequently, an insulating layer made of $Al_2O_3$, $SiO_2$, for example, is deposited by using a sputtering method, for example, and the resultant layer is planarized by CMP, for example, to form a planarized layer 78. Thereafter, on the planarized surface, the overcoat layer 42 comprised of $Al_2O_3$, $SiO_2$, for example, is formed by using a sputtering method, for example. Through these processes, the formation processes of the MR effect element and the electromagnetic coil element are completed.

Thus, the manufacturing process of the thin-film magnetic head for longitudinal magnetic recording shown in FIG. 4a is explained. Needless to say, this magnetic head can be manufactured under different formation condition, and according to different manner. Further, in also the thin-film magnetic head for perpendicular magnetic recording shown in FIG. 4b, the above-described manufacturing method can be similarly put into practice or applied.

FIGS. 8a to 8e show schematic views from the head end surface 300 side, for explaining a formation process of the end of the upper and lower magnetic layers in the electromagnetic coil element 34 in FIG. 4a.

Figure 8A:
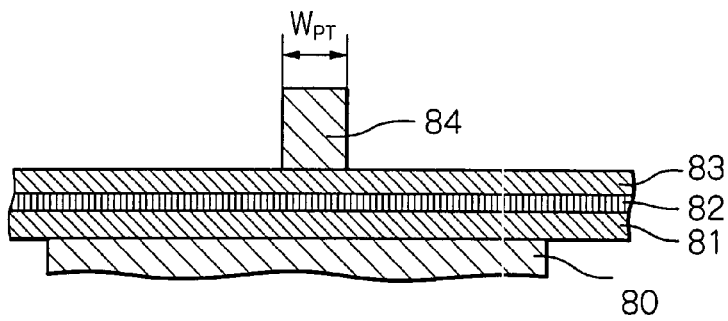

Firstly, as shown in FIG. 8a, on the element formation surface of the slider substrate (not shown), by using a sputtering method, for example, sequentially formed are a lower yoke film 80 with thickness of approximately 0.5 to 3 µm, a lower magnetic pole film 81 with thickness of approximately 0.1 to 0.5 µm, a write gap film 82 with thickness of approximately 0.01 to 0.1 µm, a first upper magnetic pole film 83 with thickness of approximately 0.05 to 0.20 µm. Subsequently, by using a plating method such as a pattern plating method including a frame plating method where the first upper magnetic pole film 83 is used as an electrode, formed is a second upper magnetic pole film 84 having a thickness of approximately 2.0 to 4.0 µm and a width in the track width direction of $W_{PT}$=about 0.2 to about 0.4 µm.

Figure 8B:
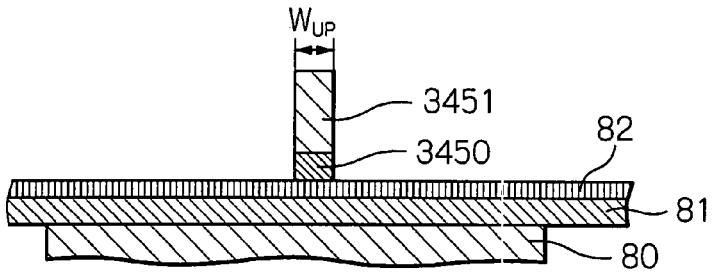
Figure 8C:
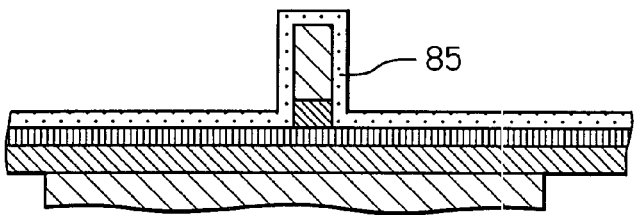

Subsequently, as shown in FIG. 8b, an ion beam etching is performed where the second upper magnetic pole film 84 is used as a mask to form the first upper magnetic pole layer 3450 and the second upper magnetic pole layer 3451 having a width in the track width direction of $W_{UP}$=about 0.1 to about 0.2 µm, formed by trimming the first upper magnetic pole film 83 and the second upper magnetic pole film 84. Here, the trimming means to process the width in the track width direction of a thin film pattern so as to be uniformly narrow in the film thickness direction. In this case, etching is performed also in the depth direction (film thickness direction), however an etching rate of width to depth can be changed or adjusted according to the incident angle of the ion beam. Subsequently, as shown in FIG. 8c, a non-magnetic mask film 85 with thickness of approximately 0.03 to 0.15 µm, made of $Al_2O_3$, AlN or SiC (silicon carbide), for example, with smaller etching rate than the lower yoke film 80, the lower magnetic pole film 81 and the write gap film 82, is formed by using, for example, a sputtering method so as to cover the first upper magnetic pole layer 3450 and the second upper magnetic pole layer 3451.

Figure 8D:
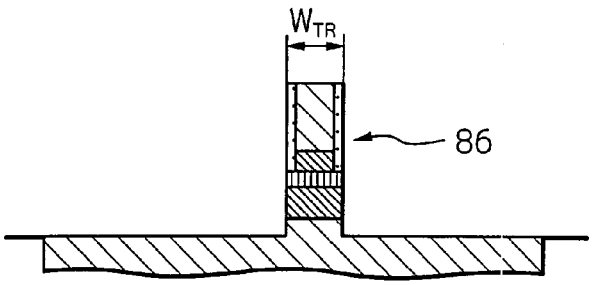
Figure 8E:
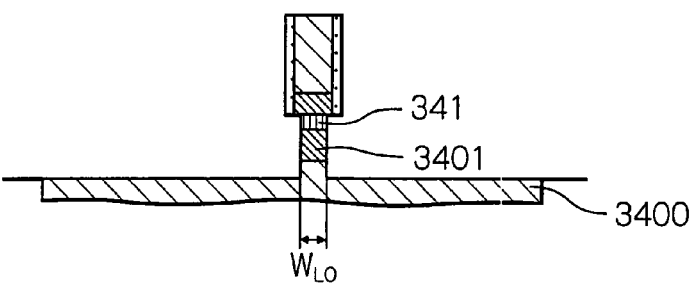

Subsequently, as shown in FIG. 8d, an ion beam etching using oblique incident ion beam is performed to form a pattern 86 having a width in the track width direction of $W_{TR}$=about 0.2 to about 0.5 µm which is larger than the width $W_{UP}$, obtained by collectively trimming an upper portion of the lower yoke film 80, the lower magnetic pole film 81, the write gap film 82, and the non-magnetic mask film 85 that covers the first upper magnetic pole layer 3450 and the second upper magnetic pole layer 3451. Subsequently, as shown in FIG. 8e, an ion beam etching using oblique incident ion beam is performed to trim the lower yoke film 80, the lower magnetic pole film 81 and the write gap film 82 without changing the width $W_{UP}$ of the first upper magnetic pole layer 3450 and the second upper magnetic pole layer 3451. Here, the etching without changing the width $W_{UP}$ is made possible because the etching rate of the non-magnetic mask film 85 is smaller than those of the lower magnetic pole film 81 and the write gap film 82. Thereby, the formation of the lower yoke layer 3400 having an upper portion of a width in the track width direction of $W_{LO}$=about 0.05 to about 0.18 µm, which is smaller than the width $W_{UP}$, and the lower magnetic pole layer 3401 and the write gap layer 341 having the same width $W_{LO}$ in the track width direction is completed. The twice of the ion beam etchings described in FIGS. 8d and 8e can be carried out in a single etching process by adjusting the incident angle of the incident ion beam. Further, an ion milling may be used as the ion beam etching. In the above-described etching process, the similar manufacturing can be performed with a reactive ion etching instead of the ion beam etching.

According to the manufacturing method explained using FIGS. 8a to 8e, it is possible to set the width $W_{UP}$ in the track width direction of the first and second upper magnetic pole layers 3450 and 3451, which are magnetic pole layers on the trailing side (on the stacking direction side in the stacked structure), to a predetermined value with high accuracy. In addition, the non-magnetic mask film 85 having smaller etching rate than that of the lower yoke film 80, the lower magnetic film 81, and the write gap film 82 is formed so as to cover the first upper magnetic pole layer 3450 and the second upper magnetic pole layer 3451. Subsequently, by using the non-magnetic mask film 85 as explained above, the width $W_{LO}$ of the lower magnetic pole layer, which is a magnetic pole layer on the leading side (that corresponds to the side opposite to the stacking direction in the stacked structure), in the track width direction can be made smaller than the width $W_{UP}$. As a result, by providing the configuration of the magnetic pole end shown in FIG. 5a, a sufficient write field can be secured, and at the same time, a thin-film magnetic head can be obtained, with which unnecessary writing or erasure to an adjacent track caused due to a leakage field is prevented. It is noted that the constituent materials, the film thicknesses, and the formation methods in this embodiment are not limited to those just described, and other various materials, film thicknesses, and methods can be applicable.

As an alternative of the above-described manufacturing method, in FIG. 8b, by using the ion beam etching or the reactive ion etching, not only the first upper magnetic pole film 83 and the second upper magnetic pole film 84 but also the write gap film 82 may be trimmed to form the write gap layer 341, the first upper magnetic pole layer 3450 and the second upper magnetic pole layer 3451 having the width $W_{UP}$ in the track width direction. As a result, with the configuration of the magnetic pole end shown in FIG. 5b, a sufficient write field can be secured, and at the same time, a thin-film magnetic head can be constructed, with which unnecessary writing or erasure to an adjacent track caused due to a leakage field is prevented.

FIGS. 9a to 9d and FIGS. 10a to 10d show schematic views from the head end surface 300 side, for explaining a formation process of the end of the main magnetic pole layer in the electromagnetic coil element 34' in FIG. 4b.

Figure 9A:
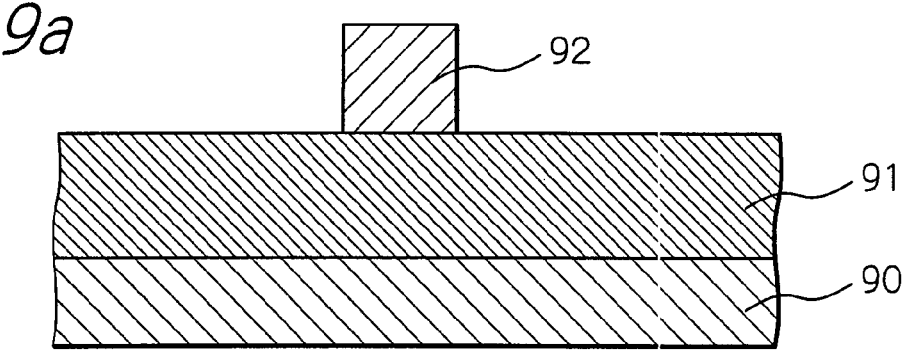
FIGS. 9a to 9d and FIGS. 10a to 10d show schematic views from the head end surface side, for explaining a formation process of the end of the main magnetic pole layer in the electromagnetic coil element in FIG. 4b.

Firstly, as shown in FIG. 9a, on the element formation surface of the substrate (not shown), a first non-magnetic film 90 with thickness of approximately 1 to 5 μm, and a main magnetic pole film 91 with thickness of approximately 0.2 to 5 μm are formed by using a sputtering method, for example. Further, on the main magnetic pole film 91, a photoresist pattern film 92 to be used as a mask is formed.

Figure 9B:
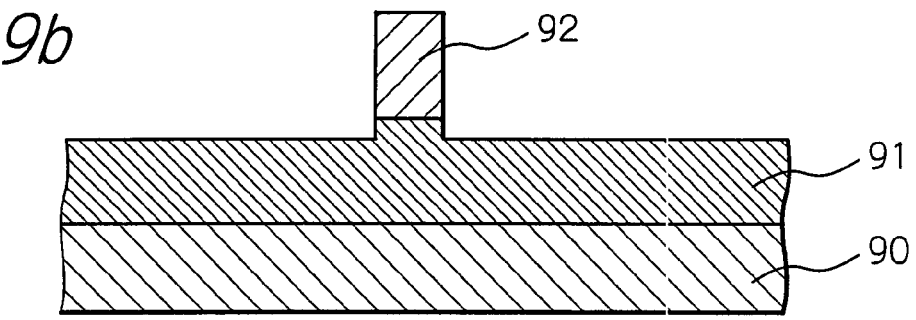
Figure 9C:
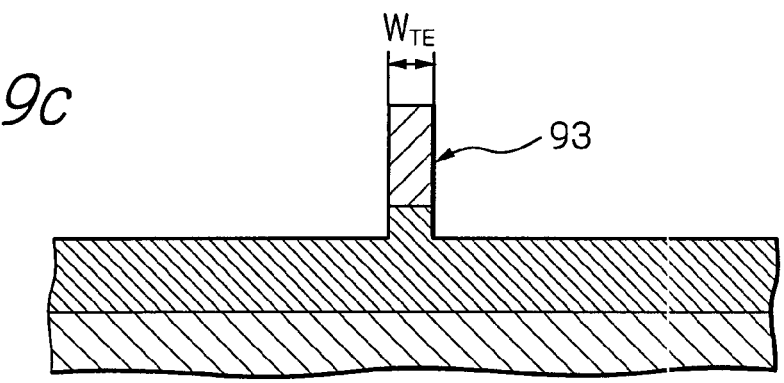
Figure 9D:
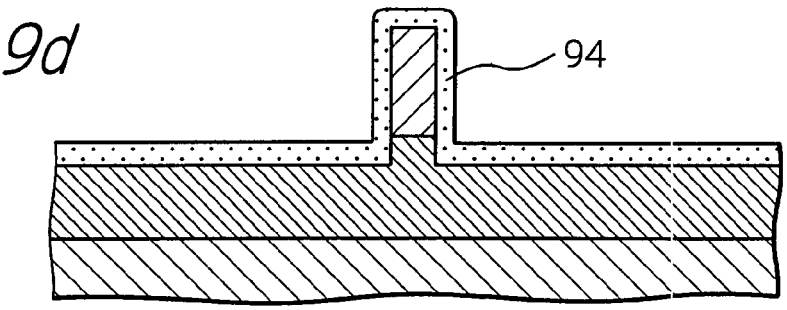

Subsequently, as shown in FIG. 9b, an ion beam etching using oblique incident ion beam is performed to collectively etch an upper portion of the main magnetic pole film 91 and the photoresist pattern film 92. Further, as shown in FIG. 9c, a trimming is performed with an ion beam etching using oblique incident ions to form a first pattern 93 having a width in the track width direction of $W_{TE}$=about 0.1 to about 0.3 μm. It is noted that twice ion beam etchings described in FIGS. 9b and 9c can be carried out in a single etching process by adjusting the incident angle of incident ion beam. Subsequently, as shown in FIG. 9d, a non-magnetic mask film 94 with thickness of approximately 0.03 to 0.10 μm, made of materials of smaller etching rate than the main magnetic pole film 91 such as $Al_2O_3$, AlN or SiC, is formed so as to cover the first pattern 93.

Figure 10A:
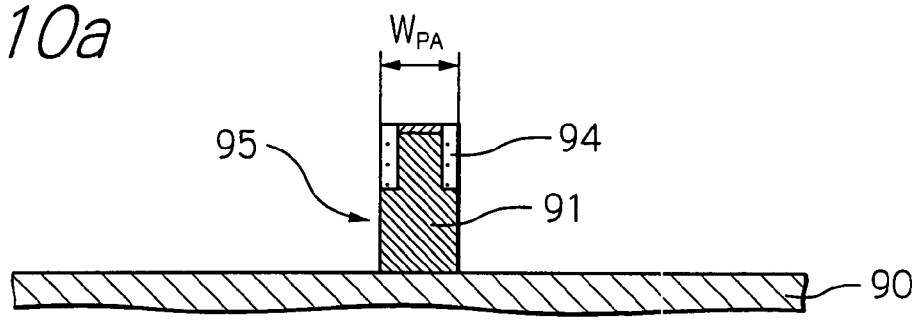

Subsequently, as shown in FIG. 10a, an ion beam etching is performed until at least the top surface of the first non-magnetic film 90 is reached to form a second pattern 95 obtained by collectively trimming the main magnetic pole film 91 and the non-magnetic mask film 94 surrounding the main magnetic pole film 91. The second pattern 95 has a width in the track width direction of $W_{PA}$=about 0.16 to about 0.5 μm, which is larger than the width $W_{TE}$.

Figure 10B:
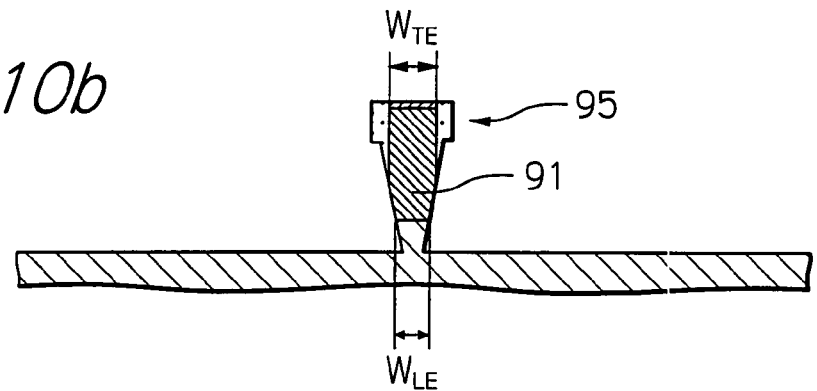
Figure 10C:
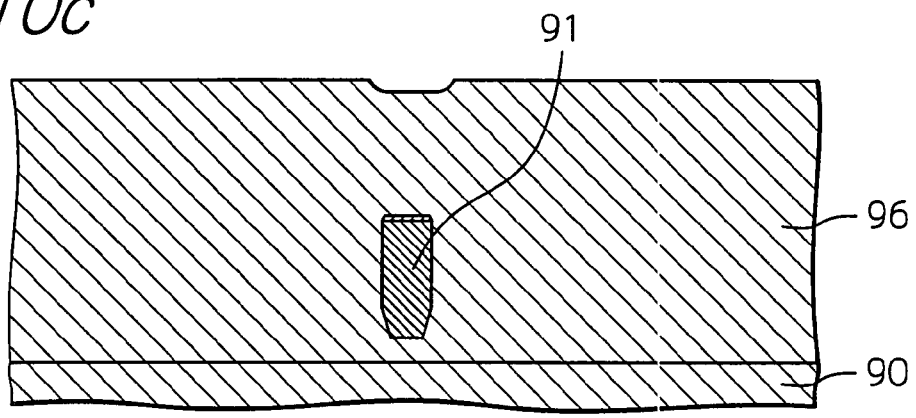
Figure 10D:
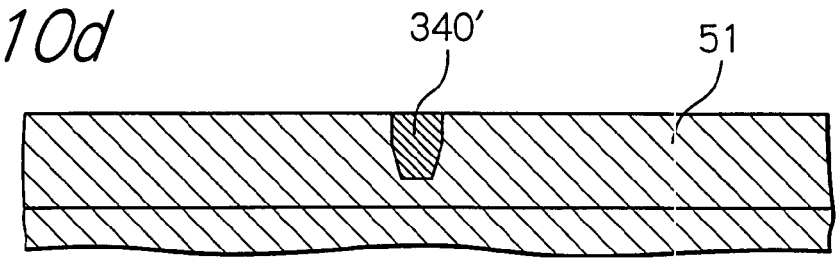

Next, as shown in FIG. 10b, an ion beam etching using oblique incident ion beam is performed and the second pattern 95 is undercut without changing the upper portion of the main magnetic pole film 91 having the width $W_{TE}$, thereby to form side surfaces with a bevel angle of the main magnetic pole layer, and the lowest surface of the main magnetic pole layer having a width $W_{LE}$ in the track width direction smaller than the width $W_{TE}$. Here, the etching without changing the width $W_{TE}$ is made possible because the fact that the ion beam etching rate of the non-magnetic mask film 94 is smaller than that of the main magnetic pole film 91. The twice of ion beam etchings described in FIGS. 10a and 10b can be performed in a single etching process by adjusting the incident angle of the incident ion beam. Subsequently, as shown in FIG. 10c, a second insulating film 96 is formed so as to cover the undercut second pattern 95. Subsequently, as shown in FIG. 10d, by using a CMP method, for example, the second non-magnetic film 96 and the upper portions of the main magnetic pole film 91 are polished, thereby to complete the formation of a main magnetic pole layer 340' surrounded by the non-magnetic layer 51 (that is, first and second insulating layers made of the first and second non-magnetic films 90 and 96). It is noted that an ion milling may be used as the above-described ion beam etching. In the above-described etching process, the similar manufacturing can be performed with the reactive ion etching is used instead of the ion beam etching.

According to the manufacturing method explained using FIGS. 9a to 9d and FIGS. 10a to 10d, it is possible to set the width $W_{TE}$ that corresponds to the length of the edge on the trailing side (on a stacking direction in the stacked structure) in the shape on the head end surface 300 of the main magnetic pole layer 340' to a predetermined value with high accuracy. Further, it is possible that the width $W_{LE}$ that corresponds to the length of the edge on the leading side (on opposite side to the stacking direction) is made smaller than the width $W_{TE}$. That is, as shown in FIG. 5c, it is possible to obtain a shape of an approximate inverted trapezoid in which the long edge is on the trailing side. As a result, a sufficient write field is secured, and at the same time, the bevel angle is imparted to the side surfaces, thereby a thin-film magnetic head can be obtained, with which unnecessary writing or erasure to an adjacent track caused due to a leakage field is prevented. It is noted that the constituent materials, the film thicknesses, and the formation methods in this embodiment are not limited to that just described, and other various materials, film thicknesses, and methods can be applicable.

Below, an effect of the lower magnetic pole layer with smaller width $W_{LO}$ than the width $W_{UP}$ of the upper magnetic pole layer in the thin-film magnetic head according to the present invention will be explained by using a conventional example and embodiments of the present invention.

CONVENTIONAL EXAMPLE, AND PRACTICAL EXAMPLES 1 AND 2

Thin-film magnetic heads according to the conventional example, and the practical examples 1 and 2 were actually manufactured and the distribution of the write field was measured. Table 1 shows substantial configurations of these heads.

TABLE 1

|  | $W_{UP}$ (μm) | $W_{LO}$ (μm) | $\Delta W$ (μm) | $T_{LP}$ (μm) | $L_G$ (μm) |
| --- | --- | --- | --- | --- | --- |
| Conventional | 0.170 | 0.170 | 0.000 | 0.400 | 0.090 |

TABLE 1-continued

|  | $W_{UP}$ (μm) | $W_{LO}$ (μm) | $\Delta W$ (μm) | $T_{LP}$ (μm) | $L_G$ (μm) |
|---|---|---|---|---|---|
| Ex. |  |  |  |  |  |
| Practical Ex. 1 | 0.170 | 0.155 | 0.015 | 0.400 | 0.090 |
| Practical Ex. 2 | 0.170 | 0.150 | 0.020 | 0.400 | 0.090 |

In the thin-film magnetic heads in the practical examples 1 and 2, differences between the width $W_{UP}$ of the upper magnetic pole layer and the width $W_{LO}$ of the lower magnetic pole layer, that is, $\Delta W = W_{UP} - W_{LO}$ (μm), were 0.015 μm and 0.020 μm, respectively, and the widths $W_{LO}$ of the lower magnetic pole layer were set to be smaller than the widths $W_{UP}$ of the upper magnetic pole layer. On the contrary, in the thin-film magnetic head of the conventional example, $\Delta W = 0.000$ μm, and the width $W_{UP}$ of the upper magnetic pole layer and the width $W_{LO}$ of the lower magnetic pole layer were the same. It is noted that the thickness $T_{LP}$ of the lower magnetic pole layer, the thickness $L_G$ of the write gap layer, and the rest of the configuration were completely the same in the conventional example and the practical examples 1 and 2.

Figure 11:
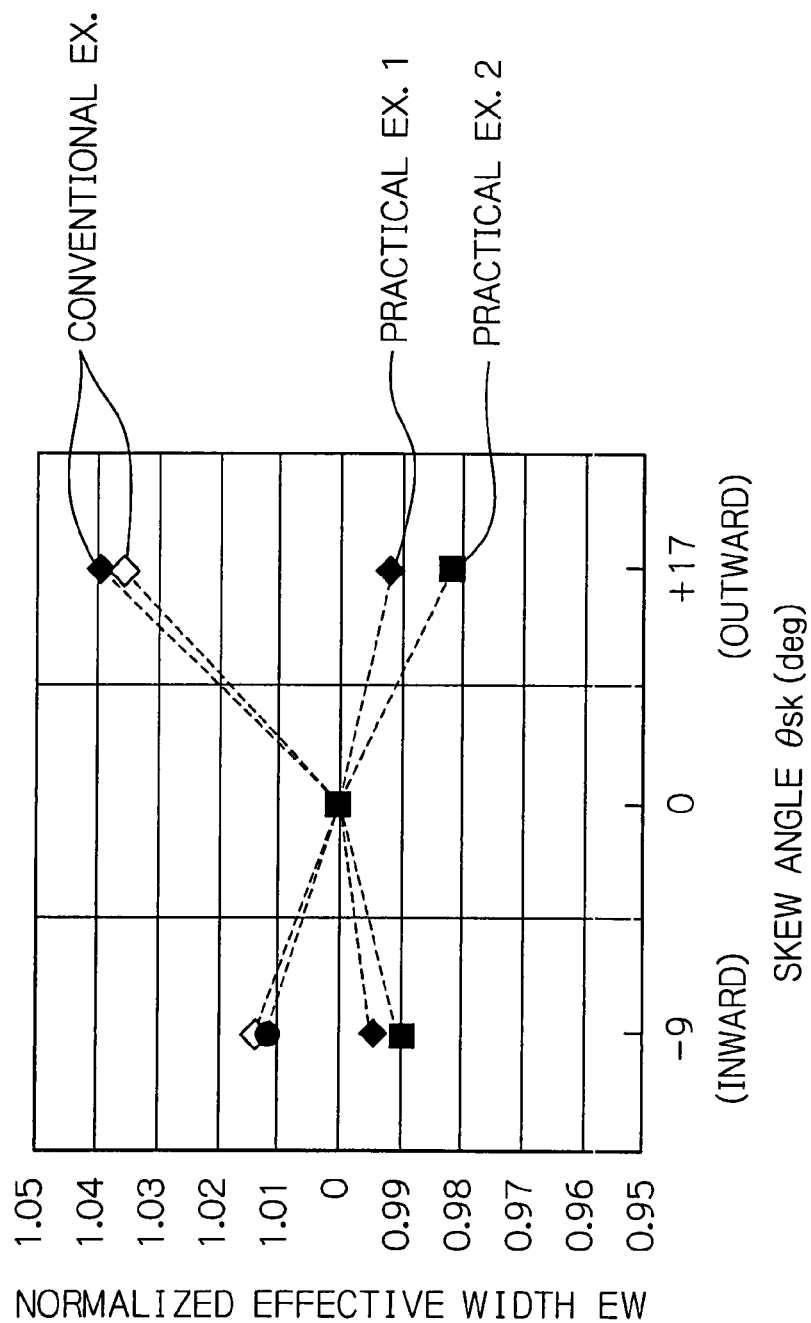
FIG. 11 shows a graph of the relationship between the skew angle $\theta_{SK}$ of the head and an effective width EW of the write field in the practical examples 1 and 2 and the conventional example.

FIG. 11 shows a graph of the relationship between the skew angle $\theta_{SK}$ of the head and an effective width EW of the write field in the practical examples 1 and 2 and the conventional example.

Here, the effective width of the write field is a value of the width of recording bits written on the magnetic disk, which is actually measured with each head under conditions of various skew angles $\theta_{SK}$ across radially inward and outward portions of the magnetic disk. The effective width EW of the vertical axis in FIG. 11 is normalized with a value at $\theta_{SK}=0$ (deg) in each head set to 1. In this case, when the effective width EW exceeds 1, this means that the write field expands over a predetermined track width. Therefore, the effective width EW is required to be 1 or less at each skew angle.

As shown in FIG. 11, in areas having a large absolute value of skew angle $\theta_{SK}$ in the radially inward and outward portions, the effective width EW of the write field exceeds 1 in the conventional example. It is noted that in the conventional example, the number of samples is 2. A reason for exceeding 1 is thought to be that since the width $W_{LO}$ of the magnetic pole layer on the leading side is the same as the width $W_{UP}$ of the magnetic pole layer on the trailing side, the magnetic pole layer on the leading side runs off a predetermined track width, and a leakage field from this magnetic pole layer increases the effective width EW, when the skew angle $\theta_{SK}$ is large.

On the contrary, in the practical examples 1 and 2, even in the areas with a large absolute value of skew angle $\theta_{SK}$ in the radially inward and outward portions, the effective width EW of the write field remains less than 1. A reason for this is thought to be that since the width $W_{LO}$ of the magnetic pole layer on the leading side is set to be smaller than the width $W_{UP}$ of the magnetic pole layer on the trailing side, the leakage field from the magnetic pole layer on the leading side does not affect the effective width EW even when the skew angle $\theta_{SK}$ is large. In the case, the effective width EW is rather decreased corresponding that the magnetic pole layer on the trailing side is inclined. This can be understood from the fact that, in the example 2 where $\Delta W$ is larger, the amount of decrease of the effective width EW is larger than that of the example 1.

Thus, the effective width EW of the write field is found to greatly depend on the $\Delta W$ and the skew angle $\theta_{SK}$. In addition, the present inventors have further measured the effective width EW in the thin-film magnetic head with a pair of additional parameters of a thickness $T_{LP}$ of the lower magnetic pole layer and a thickness $L_G$ of the write gap layer that greatly affect the distribution of the write field intensity.

Figure 12:
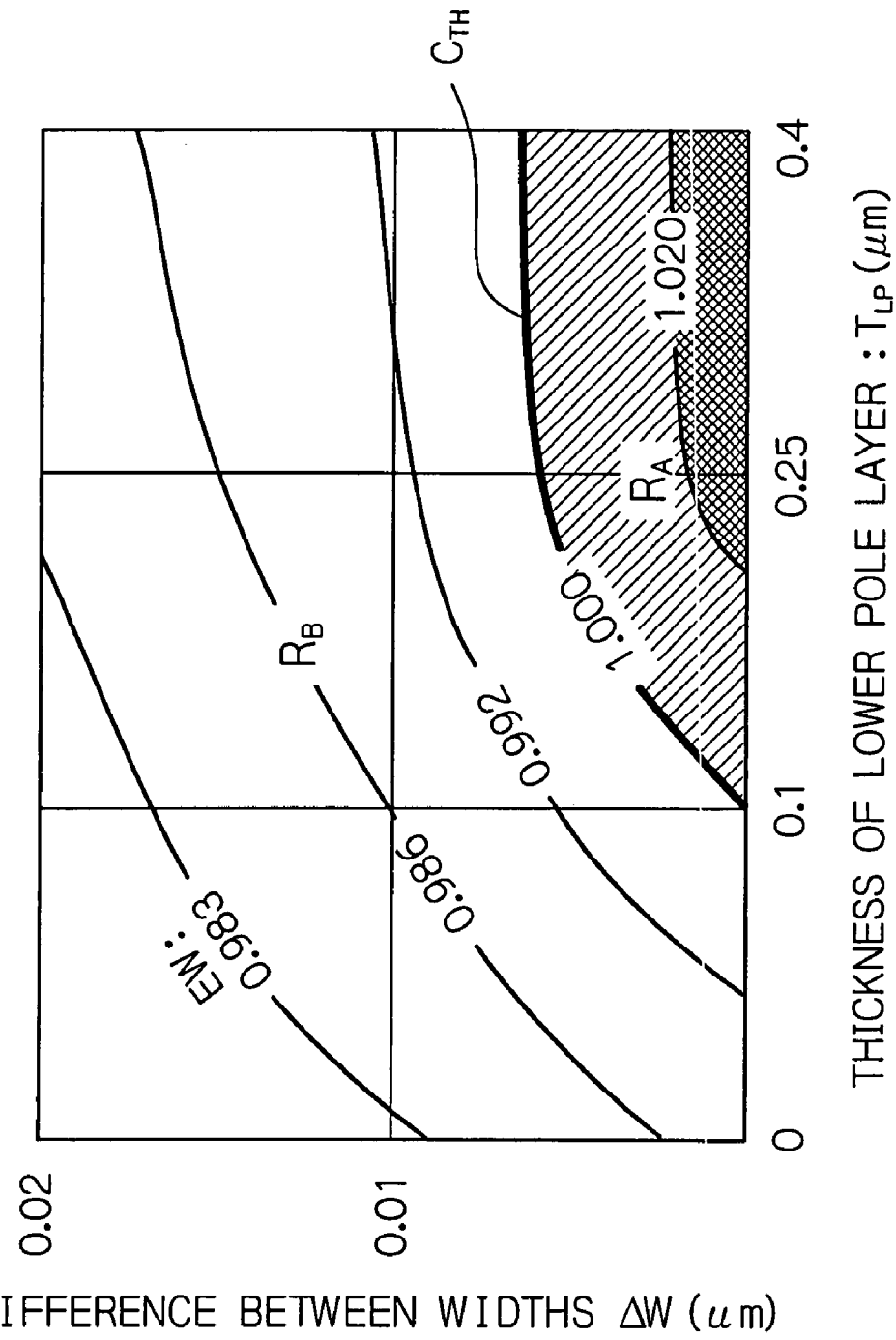
FIG. 12 shows a graph of a part of the measured results of effective widths EW with various values of thickness $T_{LP}$ of the lower magnetic pole layer and various values of ΔW.

FIG. 12 shows a graph of a part of the measured results of effective widths EW with various values of thickness $T_{LP}$ of the lower magnetic pole layer and various values of $\Delta W$. In FIG. 12, the horizontal axis represents the thickness $T_{LP}$ of the lower magnetic pole layer and the vertical axis represents the $\Delta W$. In the figure, the upper in relation to the vertical axis a point is plotted, the smaller the width $W_{LO}$ becomes comparing to the width $W_{UP}$. The measurement shown in FIG. 12 was performed with the width $W_{UP}$ of the upper magnetic pole layer of 0.17 μm, the thickness $L_G$ of the write gap layer of 0.090 μm, and the skew angle $\theta_{SK}$ of 15 deg.

According to FIG. 12, in a lower right corner of an area $R_A$ on the graph where the thickness $T_{LP}$ of the lower magnetic pole layer is large and the width difference $\Delta W$ is small (the width $W_{LO}$ is large), the effective width EW exceeds 1. Therefore, this proves that the thin-film magnetic head having data points plotted in an area B that is the area other than the area A is the required head. Here, by determining a curve $C_{TH}$ that forms a boundary between the areas A and the area B, a relational expression to be satisfied by the thickness $T_{LP}$ and the $\Delta W$ becomes clear. The present inventors performed analysis based on the measured results with respect to the above-described four parameters, including the relationship shown in FIG. 12, to derive the following conditional expression (1):

$$T_{LP} \leq (42 L_G \cdot \tan \theta_{SK})^{-1} \cdot (a(\Delta W/2)^3 + b(\Delta W/2)^2 + c(\Delta W/2) + d), \quad (1)$$

where $a = 3333355.0$, $b = -7500.0$, $c = 14.0$, and $d = 0.1$.

The area B in FIG. 12 precisely corresponds to an expression obtained by substituting $W_{UP} = 0.17$ μm, $L_G = 0.090$ μm, and $\theta_{SK} = 15$ deg for the conditional expression (1).

Based on the above results, in the thin-film magnetic head having the parameters that satisfy the conditional expression (1) according to the present invention, even when the skew angle of the dead becomes larger than 0 (zero), the effective width EW of the write field does not increase. That is, it is understood that, with the thin-film magnetic head according to the present invention, the unnecessary writing or erasure to the adjacent track caused due to the leakage field from the magnetic pole layer on the leading side is surely prevented.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A manufacturing method of a thin-film magnetic head comprising steps of:

forming a main magnetic pole film on a first nonmagnetic layer formed on or above an element formation surface of a substrate;

forming a photoresist pattern film used as a mask on said main magnetic pole film;

forming a first pattern having a width $W_{TE}$ in a track width direction, obtained by collectively trimming said photoresist pattern film and at least an upper portion of said main magnetic pole film by means of ion beam etching or reactive ion etching;

forming a non-magnetic mask film made of a nonmagnetic material having a smaller etching rate than said main magnetic pole film so as to cover said first pattern;

forming a second pattern having a width $W_{P4}$ larger than said width $W_{TE}$ of said first pattern, in a track width direction, obtained by collectively trimming said main magnetic pole film and said non-magnetic mask film surrounding said main magnetic pole film by means of ion beam etching or reactive ion etching at least until an upper surface of said first non-magnetic layer is reached;

thereafter or at the same time of said forming said second pattern, forming: side surfaces, having a bevel angle, of said main magnetic pole layer; and a lowest surface of the main magnetic pole layer having a width $W_{LE}$, smaller than said width $W_{TE}$ of said first pattern, in a track width direction, by undercutting said second pattern without changing an upper portion having said width $W_{TE}$ of said first pattern of said main magnetic pole film by means of ion beam etching or reactive ion etching;

forming a second non-magnetic film so as to cover said second pattern that has been undercut; and forming a main magnetic pole layer surrounded by said second non-magnetic film by polishing said second non-magnetic film and an upper portion of said main magnetic pole film.

2. The manufacturing method as claimed in claim 1, wherein said non-magnetic mask film is an alumina film, an aluminum nitride film or a silicon carbide film.

* * * * *